United States Patent [19]

Lert, Jr. et al.

[11] Patent Number: 4,677,466
[45] Date of Patent: Jun. 30, 1987

[54] BROADCAST PROGRAM IDENTIFICATION METHOD AND APPARATUS

[75] Inventors: John G. Lert, Jr., Tampa; Daozheng Lu, Dunedin, both of Fla.

[73] Assignee: A. C. Nielsen Company, Northbroon, Ill.

[21] Appl. No.: 760,328

[22] Filed: Jul. 29, 1985

[51] Int. Cl.⁴ .............................. H04N 17/00
[52] U.S. Cl. ........................ 358/84; 455/2; 455/67
[58] Field of Search .......... 358/84, 139, 908; 455/2, 67

[56] References Cited

U.S. PATENT DOCUMENTS

| | | |
|---|---|---|
| 3,745,240 | 7/1973 | Morchand et al. . |
| 3,919,479 | 11/1975 | Moon et al. ............... 358/84 X |
| 4,060,695 | 11/1977 | Suzuki et al. . |
| 4,084,245 | 4/1978 | Bunge . |
| 4,230,990 | 10/1980 | Lert, Jr. et al. ............. 358/84 X |
| 4,258,386 | 3/1981 | Cheung ........................ 358/84 |
| 4,314,285 | 2/1982 | Bonner et al. . |
| 4,390,904 | 6/1983 | Johnston et al. ............ 358/908 X |
| 4,420,769 | 12/1983 | Novak ........................ 358/139 |
| 4,450,531 | 5/1984 | Kenyon et al. .............. 358/84 X |
| 4,455,634 | 6/1984 | Efron et al. . |
| 4,499,601 | 2/1985 | Matthews ..................... 455/2 |
| 4,511,917 | 4/1985 | Köhler et al. ............... 358/84 |
| 4,574,304 | 3/1986 | Watanabe et al. ........... 358/84 |

*Primary Examiner*—Keith E. George
*Attorney, Agent, or Firm*—Mason, Kolehmainen, Rathburn & Wyss

[57] ABSTRACT

A method and apparatus for identifying repetitively broadcast programs, such as commercial advertisements broadcast on television and radio, detects the occurrence of predetermined events in a video signal and/or in an audio signal, detects a stability condition and extracts a signature from the video and/or audio signal. The signatures and the times of occurrence of the signatures are stored and subsequently compared with reference signatures to identify the program and its time of broadcast. The reference signatures may be obtained by identifying repetitively extracted, unidentified signatures and indexing a recording of the video and/or audio signals to enable the system user to identify the unidentified broadcast program and store the previously unidentified signatures as additional reference signatures in memory.

90 Claims, 7 Drawing Figures

BROADCAST PROGRAM IDENTIFICATION METHOD AND APPARATUS

BACKGROUND OF THE INVENTION

1. Field of the Invention

This invention relates generally to methods and apparatus for identifying repetitively broadcast programs, and more particularly to a method and apparatus for identifying repetitively broadcast programs, such as commercial advertisements broadcast on television and radio.

2. Description of the Prior Art

Systems for identifying programs such as television and radio programs that are broadcast are known. Such systems fall into various categories. These categories include manual systems wherein a clerk keeps a log indicating the programs broadcast by a given station; systems that detect identifying signals present in the television or radio broadcast signal; and systems that monitor and analyze the program content of the broadcast signal utilizing pattern recognition and correlation techniques to identify the program. While all of these systems provide a way to identify programs and to confirm that commercial advertisements are made available for public viewing, the manual methods are slow in acquiring data and are prone to inaccuracies resulting from the entry of erroneous data that may be intentionally or unintentionally entered.

Systems that detect identification signals encoded on the broadcast signal require the cooperation of the broadcasters who must encode the programs prior to broadcast for such systems to be effective. Consequently, such systems are useable only on a limited number of broadcasts, such as network broadcasts. Other known systems monitor and analyze the content of the program itself, but heretofore the information processing requirements of such systems rendered such systems impractical or uneconomical because of the computing capacity required to analyze the vast quantity of information present in broadcast signals. Moreover, previous attempts to reduce the quantity of information processed tended to introduce inaccuracies.

An example of a system that utilizes the program content of a broadcast signal to identify the program is described in U.S. Pat. No. 3,919,479 to Moon et al. The Moon et al. system utilizes a non-linear analog transform to produce a low-frequency envelope waveform, and the information in the low-frequency envelope of predetermined time interval is digitized to generate a signature. The signatures thus generated are compared with reference signatures to identify the program. However, the Moon et al. system generates the signatures continuously, and consequently, requires a large computer to process the data thus generated.

Another system that monitors the program content of a broadcast signal is disclosed in U.S. Pat. No. 4,230,990 to Lert, Jr. et al. The system disclosed in Lert, Jr. et al. patent reduces the amount of data that must be processed, as compared to the data amount to be processed by the Moon et al. patent, by utilizing cues that are either externally generated or present in the program material to initiate the signature generation and correlation process only after a cue has been detected. However, in the system disclosed in the Lert, Jr. et al. patent, a signature is extracted at a predetermined time following a detected cue signal, and inaccuracies may be introduced if the signal is not stable at the time of signature extraction or the extracted signature must include a large quantity of data for identification of the program with the desired accuracy.

SUMMARY OF THE INVENTION

It is an object of the present invention to provide a method and apparatus for identifying programs that overcomes many of the disadvantages of the prior art systems.

It is another object of the present invention to provide an improved method and apparatus for monitoring broadcasts and identifying repetitively broadcast programs and the time of occurrence of the broadcast and the duration of the broadcast.

It is another object of the present invention to provide a system that accurately identifies programs with a minimal amount of computation utilizing data reduction and pattern recognition techniques on the program material.

It is still another object of the present invention to provide a program identification system that extracts program identifying signatures only upon the occurrence of certain predetermined events.

It is another object of the present invention to provide a program identifying system that extracts program identifying signatures from the program material and compares the extracted signatures with multiple reference signatures to accurately identify the program.

It is another objective of the present invention to provide a program identifying system that extracts program identifying signatures from the program material, compares the extracted signatures with reference signatures for signature recognition, utilizes a series of successive, recognized extracted signatures according to a predetermined rule to accurately identify the program.

It is yet another object of the present invention to provide a program identifying system that monitors the broadcast program for the occurrence of certain predetermined events, detects a stability condition following the occurrence of a certain predetermined event, and then extracts the program identifying signature.

It is yet another object of the present invention to provide a system that identifies repetitively broadcast, unidentified signatures, assigns an index code to a recording of the broadcast to enable a system user to view the new broadcast program and to add the previously unidentified signature as a reference signature to a system memory containing the reference signatures.

Briefly, in accordance with a preferred embodiment of the invention, there is provided a system having a station monitoring unit that monitors a particular broadcast source. The station monitoring unit includes a receiver for receiving programs broadcast on television or radio. The receiver is tuned to a particular broadcast source to be monitored. The monitored signals of the receiver are applied to audio processing circuitry, video processing circuitry and a video recorder. The processed video signals and the processed audio signals are appplied to an events detector. Also, the processed audio signals are applied to audio signature extraction circuitry and the processed video signals are applied to video signature extraction circuitry. Both the audio and video signature extraction circuitry include an enable input coupled to the events detector. Upon the detection of one of a plurality of predetermined events, the events detector thereafter detects a stability condition in the monitored signal and then enables the signature extraction circuitry. The extracted signatures from both the audio signature extraction circuitry and the video signature extraction circuitry are combined according to a predetermined format to form a composite extracted signature that is stored. The time of occurrence of the thus extracted signature is stored and subsequently the extracted signature is compared with reference signatures to identify a broadcast program and its time of broadcast. The reference signatures are obtained by identifying repetitively extracted, unidentified signatures and assigning a temporary identification code to enable a system user to view the recorded program on a video recording and provide identification for the new reference signatures.

DESCRIPTION OF THE DRAWING

These and other objects and advantages of the present invention will become readily apparent upon consideration of the following detailed description and attached drawing, wherein.

DETAILED DESCRIPTION OF THE PREFERRED EMBODIMENT

Figure 1:
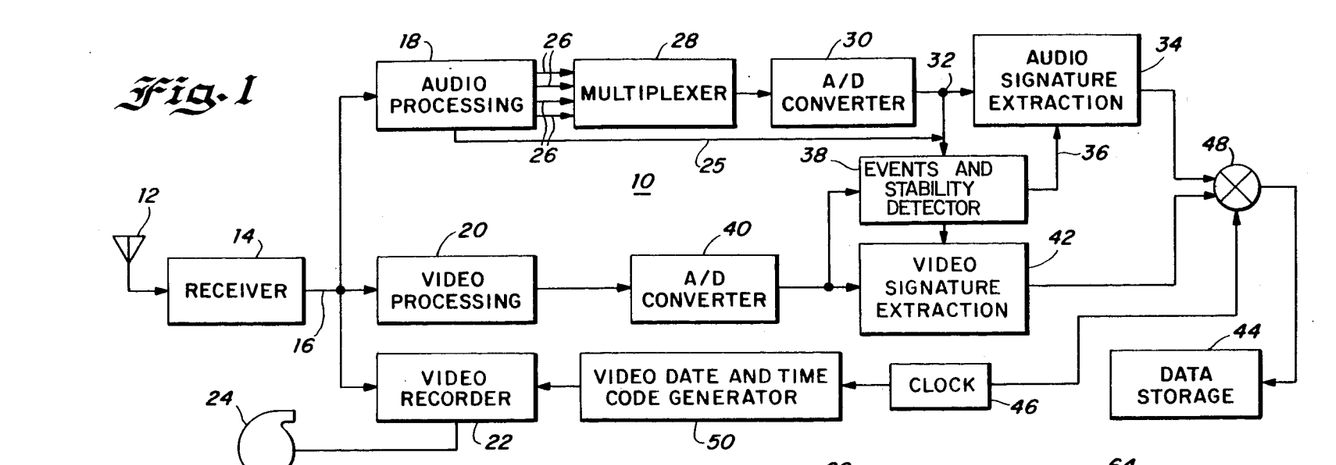
FIG. 1 is a block diagram of a broadcast station monitoring unit of the broadcast program identification system according to the present invention.

Referring now to the drawing, with particular attention to FIG. 1, there is illustrated a block diagram of a station monitoring unit of the system according to the invention designated generally by the reference character 10. The station monitoring unit 10 receives television broadcast signals from a receiving antenna 12. While the station monitoring unit 10 is depicted and generally described herein for monitoring a television broadcast signal which includes both video and audio signals, the principles of the present invention disclosed herein are equally applicable to a broadcast radio signal. The received signals are applied to a receiver 14 which includes a tuner and amplifier. The receiver 14 is tuned to a desired broadcasting station to be monitored to provide a desired program signal 16 at the output of receiver 14. The program signal 16 is applied to audio processing circuitry 18, video processing circuitry 20 and a recorder 22, such as a video cassette recorder or a VCR 22. The program signal 16 is recorded on a video tape 24 within the VCR 22.

The audio processing circuitry 18 includes an energy detector and a plurality of bandpass filters, and provides a detected energy signal 25 and, a plurality of signals 26 representative of an audio spectrum that may be, for example, in a range between 330 Hz and 2.54 kHz. An ASA-16 speech preprocessor integrated circuit manufactured by Interstate Electronics Corporation of Orange, Calif., may be employed to provide the bandpass filtering of audio processing circuitry 18. The audio spectrum signals 26, for example, 12 bandpass signals, are applied to a multiplexer 28 which provides the analog spectrum signals to an analog-to-digital (A/D) converter 30. The A/D converter 30 generates digital representations of the audio spectrum signals or digitized audio signals 32. The digitized audio signals 32 are applied to both an audio signature extraction circuit 34 and to an events detector 38. The detected energy signal 25 is applied to the events detector 38. The events detector 38 has an output that is coupled to an enable input 36 of the audio signature extraction circuitry 34. The audio signature extraction circuitry 34 extracts an audio signature from the digitized audio signals 32 when enabled by the events detector 38 which is discussed subsequently in greater detail.

The video processing circuitry 20 includes a detector and a low-pass filter having, for example, a cut-off frequency of approximately 0 to 2 kHz, and provides a signal representative of the envelope of the video signal to an analog-to-digital (A/D) converter 40 which generates a digital representation of the video envelope. The digitized video envelope signal is applied to both a video signature extraction circuit 42 and the events detector 38 which detects predetermined events that occur in the digitized video signal, and causes the signature of the digitized video signal to be extracted by video signature extraction circuitry 42. The signature thus generated is stored in a data storage device or memory 44 along with a time that the signature was extracted. The extraction times are provided by a clock 46 which provides a digital representation of time to the data storage device 44 via, for example, a combining circuit 48. The clock 46 may be a real time clock or a relative time clock that is periodically reset from an accurate clock, for example, a timing signal transmitted by the National Bureau of Standards. The clock 46 provides the digital representation of time to a video date and time code generator 50 which applies the digital representation of time to the VCR 22 for storage on the video tape 24. The function of the events detector 38, the audio signature extraction circuitry 34, the video signature extraction circuitry 2, the data storage 44 and the clock 46 can be per2, formed by individual circuits as shown or by a microcomputer, a personal computer, or various microprocessor based systems.

Figure 2:
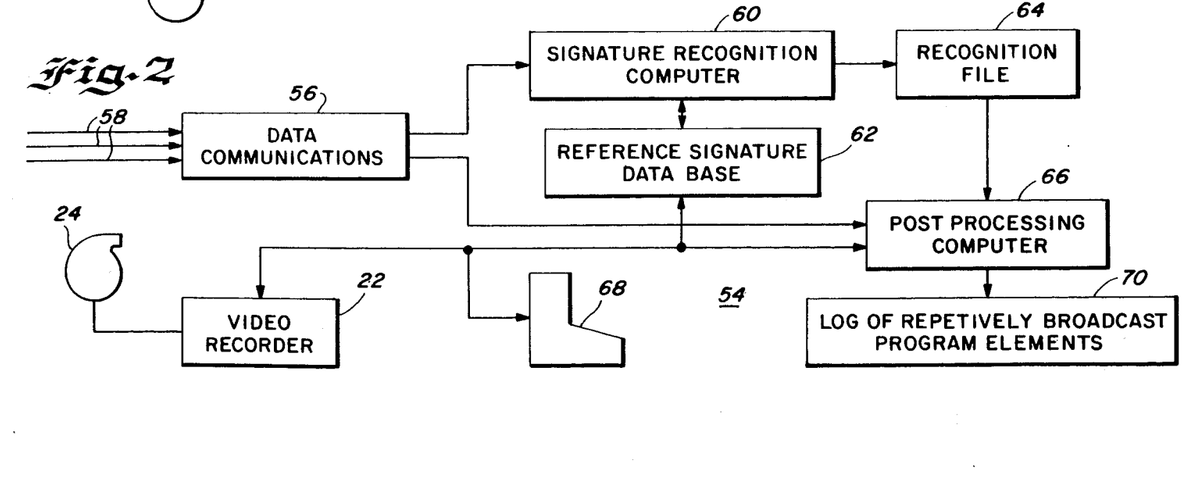
FIG. 2 is a block diagram of a recognition and post-processing unit of the broadcast program identification system according to the invention.

Referring to FIG. 2, there is shown a block diagram illustrating a signature recognition and postprocessing unit designated generally by the reference character 54. The station monitor unit 10 (FIG. 1), extracts and stores signatures and times of extraction thereof, and applies the signatures to the signature recognition and post-processing unit 54 which compares the extracted signatures from the various station monitoring units 10 with a plurality of reference signatures taken from identified programs in order to identify particular broadcast programs corresponding to the extracted signatures received from the station monitoring units 10. The station monitoring units 10 may be interrogated at periodic intervals by a data communication circuit 56 that accesses the various station monitoring units 10 via a suitable communications system, for example an RS-232 Serial communication line, a common computer bus or a plurality of telephone lines 58.

The extracted signatures thus collected are compared by a signature recognition computer 60 to a plurality of reference signatures stored in a memory or reference signature data base 62. The signature recognition computer 60 performs the collection and classification of the signatures received from the station monitoring units 10, as well as the generation of reference signatures to be stored in the reference signature data base 62. The signature recognition computer 60 compares the extracted signatures to the reference signatures stored in data base 62 and classifies and stores the signatures in a recognition file 64 which is coupled to a post-processing computer 66. The signature recognition computer 60 utilizes successive recognized extracted signatures to identify a particular program. The recognized extracted signatures from the various station monitoring units 10 are applied to the post-processing computer 66. The post-processing computer 66 produces a file or log 70 of the identified programs, commercial advertisements or other repetitively broadcast programs from each monitored station and can include the starting time of each identified or recognized program and the duration of the program. In addition, such analytical operations can provide various logical checks to flag incomplete or otherwise defective broadcasts of repetitively broadcast programs, and thereby enable the detection of possible false signal recognitions.

Occasionally, signatures that do not match any reference signatures will be extracted. Such signatures may be flagged by the system, particularly if such signatures occur between blank frames, and more particularly, if such blank frames occur at 30 second intervals or less or multiples of 30-second intervals indicating that the unidentified signatures probably are part of a commercial message. The signatures are then compared against each other to find repetitive signatures and to avoid duplication. The post-processing computer 66 assigns a temporary code to identify each repetitive non-recognized or unmatched extracted signature and stores the time of occurrence of the unidentified program. Thereby, a system user is enabled to view the video recording from the video tape 24 and identify new broadcast programs. A data entry terminal 68 is employed to update the reference signature data base 62 to add new reference signatures so that subsequent broadcast of the repetitively broadcast program elements are correctly identified.

Figure 3:
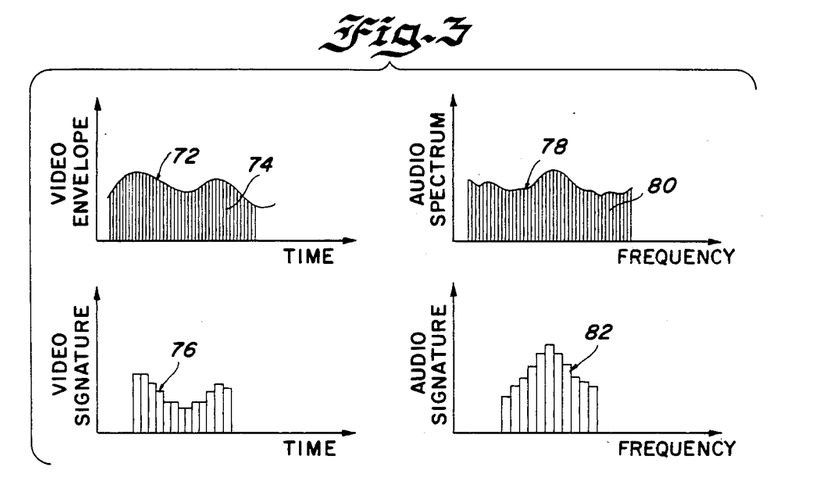
FIGS. 3 and 4 depict various waveforms associated with the block diagram of FIG. 1.

Referring now to FIG. 3, there are shown waveforms illustrating the operation of the station monitoring unit 10 of FIG. 1. The output of the video processing circuitry 20 that is applied to the A/D converter 40 is shown as a video envelope 72. The A/D converter 40 takes a plurality of samples 74, for ( example, 56 samples taken during a selected portion of a single frame interval, and generates a digital value representative of the amplitude of each of the samples 74. The digital values thus generated are applied to the events detector 38 (FIG. 1) and to the video signature extraction circuit 42 and are used to detect the certain predetermined events, to detect the stability condition following the occurrence of the particular predetermined event and to extract signatures.

The video signature extraction circuit 42 operates on the digitized samples 74 by taking the average value of consecutive samples 74, for example, two consecutive samples to generate a total of, for example, 28 average values or features 76 that comprise an image signature. Typically four bits define a feature, and consequently, an image or video signature can be defined by 112 bits of data for the example discussed above; however, in some instances more features and more data may be required.

Similarly, an audio spectrum 78 is shown as the output of the audio processing circuit 18 that operates, for example, in the range between 330 Hz and 2.54 kHz to form 12 bandpass signals 80 which are digitized by the A/D converter 30. The audio signature extraction circuit 34 operates on the digitized bandpass signals 80 to generate a total of, for example, 12 features 82 that comprise an audio signature. By utilizing four bits to define a feature, the audio signature can be defined by 48 bits. As described hereinbefore, the audio signatures are extracted from the amplitude of the digitized audio signals when enabled by the events detector 38. The audio signature extraction circuit 34 typically is enabled a predetermined time after the video signature extraction circuit 42 is enabled, for example $\frac{1}{8}$ second later. The video envelope signature corresponding to the video features 76 and the audio spectrum signature corresponding to the audio features 82 advantageously can be combined into a composite signature. The extracted composite signature is formed, for example, by concatenating the video and audio signatures into a signature string of 160 bits.

Figure 4:
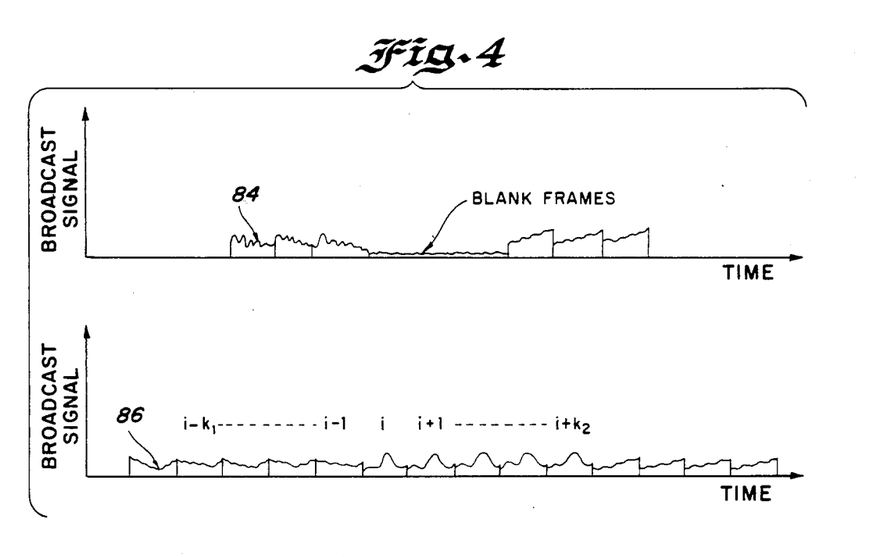

Referring now to FIG. 4, there are shown waveforms 84, 86 illustrating two examples of the processed broadcast signal that is applied to the events detector 38 via A/D converter 40. The events detector 38 compares the digitized samples 74 of a current frame i with corresponding digitized samples 74 of a previous frame, either the immediately preceeding frame i-1 or another previous frame i-$k_l$ where $k_l$ is used to indicate a variable length of time as may be determined, for example, by counting synchronization pulses. The detected audio energy signal 25 (FIG. 1) is applied to the events detector 38 for detecting specific events, for example, blank frames.

Referring first to the broadcast signal designated 84 in FIG. 4, blank frames are illustrated within the waveform 84. At least one blank frame is commonly used in the United States to separate commercial advertisements from other program material and during the blank frame there is generally silent audio. The events detector 38 compares the digitized samples 74 (FIG. 3) and the detected audio energy signal 25 (FIG. 1) with predetermined threshold values and thereby detects a blank frame wherein the sum of the digitized samples 74 are less than the predetermined threshold values for a time period corresponding to a frame. After a blank frame is detected, the digitized samples 74 of a subsequent frame are compared to a second threshold value to detect a non-blank frame before a signature is extracted from the broadframe cast signal.

The events detector 38 detects other predetermined events, such as slow scene or gradual scene changes. A slow scene change occurs during a sequence of frames in which one image is gradually replaced by the superimposition of another image. The events detector 38 compares each of the digitized samples 74 and 80 of the current frame i with a corresponding digitized sample 74 and 80 of a previous frame, for example, the frame i-$k_l$. The counterpart samples are then compared to determine whether a scene change has occurred. More specifically, the detection of a scene change occurs as follows:

1. Generate, for example, 56 samples from a portion of each frame of the video envelope 72, for example, from the middle 60% of each frame;
2. Compare counterpart samples 74 of the current frame i and the previous frame i-kl;
3. Calculate the absolute value of the difference of each of the counterpart samples 74;
4. Calculate the average of the absolute values; and 5. Indicate a scene change when the average of absolute values exceeds a predetermined threshold value.

Where the scene change occurs and $k_l$ equals 1, a sudden scene change is indicated, and when $k_l$ is greater than 1, a slow scene change is indicated.

The station monitoring unit 10 monitors the broadcast signal and extracts signatures from the particular monitored signal when certain other predetermined events are detected, which may, for example, be any one of the following:

1. A predetermined time interval (e.g., 3-10 seconds) since the previous predetermined event; this predetermined time interval may be determined, for example, by providing a time-out timer having the predetermined time period;

2. A color change in successive frames or portions thereof; such color change may be determined, for example, by detecting the average amplitude of a particular color component, such as a blue component, of each frame or a portion thereof and making comparisons with a previous frame of the type described hereinabove; and 3. An audio level change, for example, by detecting the average magnitude of the audio signal for each frame, and making comparisons with a previous frame of the type described hereinabove.

After the station monitoring unit 10 detects the occurrence of certain ones of the predetermined events, for example, the slow scene change, the blank frame and time-out events, the events detector 38 detects a stability condition, and then provides enable signals to the audio and video signature extraction circuits 34, 42. The events detector 38 compares the frame i wherein the predetermined event occurs with a subsequent frame, for example, $i+k_2$. The counterpart samples are compared to determine if a stability condition has occurred. More specifically, the detection of a stability condition occurs as follows:

1. Generate corresponding samples, for example, 56 samples from a portion of a subsequent frame after the occurrence of the certain predetermined event;
2. Compare counterpart samples (74) of the frame i and a subsequent frame $i + k_2$;
3. Calculate the absolute value of the difference of each of the counterpart samples (74);
4. Calculate the average of the absolute values;
5. Indicate a stability condition if the average of the absolute values is less than a predeteraverage mined threshold value; and
6. If a stability condition is not indicated, increment i and repeat the above steps using the new value for i.

After the station monitoring unit 10 detects the occurrence of the stability condition following certain detected predetermined events, the events detector 38 provides enable signals to the audio and video signature extraction circuits 34, 42. As described hereinbefore, the video signature and audio signatures are extracted, combined and stored along with the time of occurrence status and station identification codes in the data storage device 44.

Figure 5:
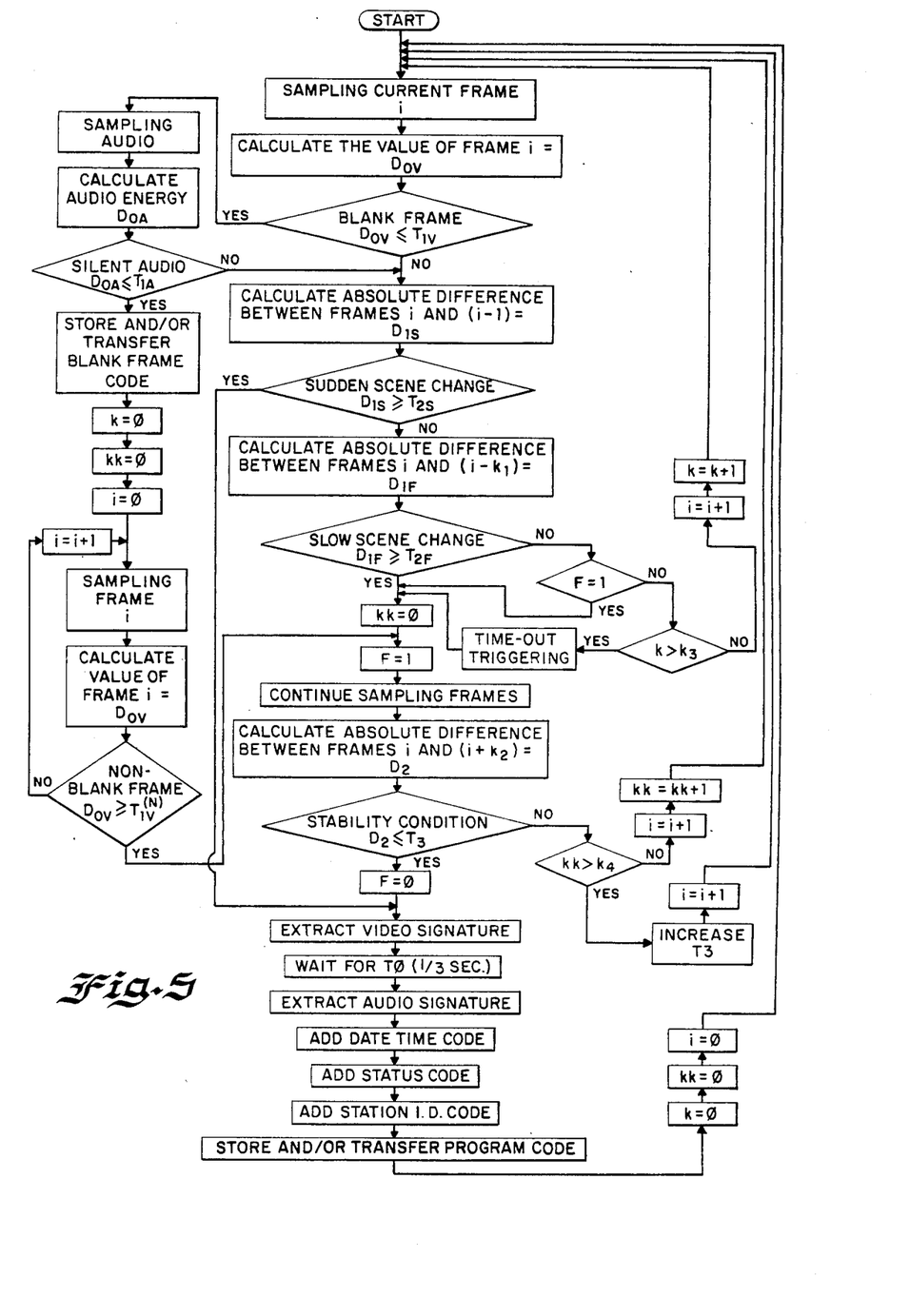
FIG. 5 is a flow chart illustrating the logical steps performed by the station monitoring unit of FIG. 1.

Referring to FIG. 5, there is illustrated a flow chart of the logical steps performed by the station monitoring system according to the invention. The station monitoring unit 10 samples the broadcast signal to detect the predetermined events, such as the blank frame, sudden and slow scene changes. This is accomplished, for example, by taking 56 samples from the middle 60% of each frame of the video envelope. The calculated average value $D_{ov}$ of the present sampled frame i is compared to a predetermined threshold value $T_{lv}$ and thereby a determination is made as to whether or not a blank frame has been broadcast. When the average value $D_{ov}$ is determined to be less than or equal to the threshold value $T_{lv}$, a decision is made that a blank frame has been broadcast. Following the detection of a blank frame, an average value of $D_{OA}$ of the audio energy signal 25 is calculated and compared to a predetermined threshold value $T_{lA}$. A determination is made that silent audio is detected when the calculated average value $D_{OA}$ is less than or equal to the threshold value $T_{lA}$. Following a determination that silent audio has been detected, a blank frame code is stored in the data storage device 44. Next a time-out timer or counter for extracting signatures from the broadcast signal at the predetermined time interval since the periodic predetermined event, indicated by the character k, is set to zero. A time-out timer or counter for adjusting the stability condition determination, indicated by the character kk, is set to zero. The present sampled frame i is reset and the average value $D_{ov}$ is calculated and is compared to a predetermined threshold value $T_{1v}^{(N)}$ to determine whether or not a non-blank frame has been broadcast following the detected blank frame. When the average calculated value $D_{ov}$ is greater than or equal to the predetermined threshold value $T_{1v}^{(N)}$, a determination is made that a non-blank frame has been broadcast. Following such detected non-blank frame, a stability condition is detected prior to extracting a signature from the broadcast signal as is described hereinafter. When a determination is made that a non-blank frame has not been broadcast, the next frame $i+1$ is sampled and the average value $D_{ov}$ is calculated to continue until a non-blank frame is detected.

When a determination is made that a blank frame has not been broadcast, a determination is made as to whether or not a sudden scene change has occurred. A sudden scene change is detected by first calculating the average value of the difference of each sample of a current frame i and an immediately prior frame i-1, calculating the average of these values, shown in FIG. 5 as $D_{1S}$, and comparing the average of the absolute values $D_{1S}$ with a predetermined threshold value $T_{2S}$. When the average absolute values $D_{1S}$ are determined to be greater than or equal to the threshold value $T_{2S}$, a decision is made that a sudden scene change has occurred. Following the detection of a sudden scene change, a signature is extracted from the broadcast signal. The signature may be extracted, for example, by extracting a video signature, waiting a predetermined time period, $T\emptyset$, for example, $\frac{1}{3}$ seconds and extracting an audio signature. The extracted video signature and the extracted audio signature are then combined into a composite signature. The composite signature may be formed by concatenating the audio and video signatures into a single string of hexadecimal numbers. A date time code, status code and station identification code are added to the composite extracted signature which is stored in the data storage device 44.

When a decision is made that a sudden scene change has not occurred, a determination is made as to whether or not a slow scene change has occurred. A slow scene change is detected by first calculating the absolute value of the difference of each sample of a current frame i and a previous frame $i-k_1$ (as illustrated in FIG. 4), calculating the average of these absolute values, shown equal to $D_{1F}$, and comparing the average of the absolute values $D_{1F}$ with a predetermined threshold value $T_{2F}$. When the average absolute values $D_{1F}$ are determined to be greater than or equal to the threshold value $T_{2F}$, a decision is made that a slow scene change has occurred. When a decision is made that either a slow scene change has occurred or a non-blank frame is detected following a detected blank frame with silent audio, an enable block is set, shown as F=1, and sampling of the frame continues until a stability condition is detected. In addition, the time-out timer for forced triggering k enables the subsequent steps in the signature extraction process after the elapse of a predetermined time period, shown as $k_3$, following a decision that F is not equal 1 and a slow scene change has not occurred.

Following the detection of certain predetermined events including a blank frame with silent audio followed by a non-blank frame, a slow scene change or time-out force triggering event, a stability condition is detected prior to extracting a signature from the broadcast signal. A stability condition may be detected, for example, by comparing the frame i with a subsequent frame $i+k_2$ and determining when the magnitude of the difference D2 between the absolute values of the samples of the two frames is less than a predetermined threshold value T3. When the difference D2 is determined to be less than or equal to the threshold value T3, a decision is made that a stability condition has been detected. Otherwise, the time-out timer kk is provided such that the comparing process is continued for a predetermined time period, shown as $k_4$, for example 3-5 seconds. When a stability condition is not detected prior to the elapse of the time period $k_4$, resetting of the threshold value T3 to a higher value, for example 50% higher, is enabled. In addition, where a stability condition is not detected before the lapse of the predetermined time period $k_4$, a signature will not be extracted until a next predetermined event is detected.

When a stability condition is detected, i.e., when the difference D2 in absolute values is less than or equal to T3, a signature is extracted from the broadcast signal. Following the storing of the composite extracted signature, the forced triggering time-out timer k, the stability condition timeout timer kk and the present frame counter i are reset to zero.

Figures 6, 7:
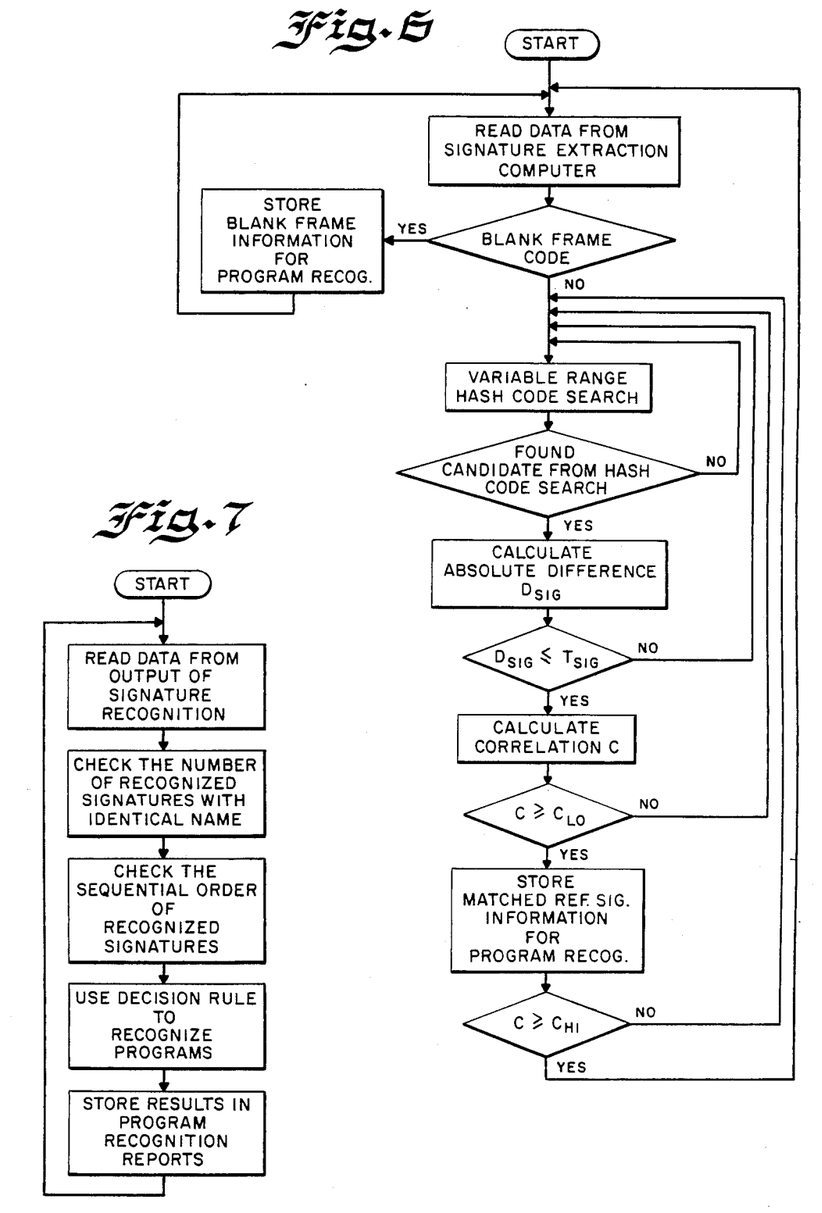
FIGS. 6 and 7 are flow charts illustrating the logical steps performed by the recognition and post-processing unit of FIG. 2.

Referring now to FIGS. 6 and 7, there are illustrated flow charts of the logical steps performed by the recognition and post-processing unit 54 according to the invention. A two-level recognition method is used to identify the particular repetitively broadcast programs.

FIG. 6 illustrates a first signature level recognition and FIG. 7 illustrates a secondary program level recognition according to the method of the invention. Considering first the logical steps shown in FIG. 6, the signature recognition computer 60 (FIG. 2) identifies and stores the blank frame code for use in the secondary program level recognition. The extracted signature is compared with a plurality of reference signatures, for example, 40,000 reference signatures, stored in the reference signature data base 62 to determine a match between the extracted signature and a reference signature. A variable range hash code search of the stored reference signatures is performed to select possible candidates therefrom. The absolute difference $D_{SIG}$ between the extracted signature and the reference signature candidate is calculated and compared to a predetermined threshold value $T_{SIG}$ to determine a possible match between the extracted signature and the reference signature candidate. When the absolute difference $D_{SIG}$ is greater than the predetermined threshold value $T_{SIG}$ the variable range hash code search is continued.

When the absolute difference $D_{SIG}$ is less than or equal to the predetermined threshold value $T_{SIG}$ indicating a possible match, a correlation coefficient is calculated between the extracted signature and the reference signature candidate. The correlation coefficient C is compared to a predetermined low threshold value $C_{LO}$ to determine whether or not the reference signature candidate is a possible match. When the correlation coefficient C is greater than or equal to the predetermined low threshold value $C_{LO}$, a match is indicated and the possible matched reference signature is stored for use in the secondary problem level recognition. Otherwise in the recognition file 64, the variable range hash code search is continued.

Following an indicated match determination, the correlation coefficient C is compared to a predetermined high threshold value $C_{HI}$ to determine whether or not another reference signature candidate should be selected. If the correlation coefficient C is less than the threshold value $C_{HI}$, the variable range hash code search is continued. When the correlation coefficient C is greater than or equal the high threshold calue $C_{HI}$, another extracted signature is read from the reference signature data base 62 and the first signature level recognition steps are repeated.

The secondary program level recognition of FIG. 7 includes reading the stored matched or recognition signatures from the signature recognition file 64, calculating the number of recognized signatures in a series with the identical program identifying name and determining the sequential order of the recognized signatures. Then a predefined decision rule is employed to identify or recognize a particular repetitively broadcast program. To recognize a particular broadcast program, the predefined decision rule may require a minimum number, for example two, recognized signatures that indicate an identical program name and have a predefined sequential order, and/or a majority of the number of recognized signatures read between stored blank frames to indicate an identical program name. The particular recognized broadcast program thus identified is stored and the post-processing computer 66 produces a file or log of the identified programs.

Obviously, modifications and variations of the present invention are possible in light of the above teachings. Thus, it is to be understood that, within the scope of the appended claims, the invention may be practiced otherwise than as specifically described hereinabove.

What is claimed and desired to be secured by Letters Patent of the United States is:

1. A method of identifying a plurality of defined broadcast programs in a broadcast signal comprising the steps of:

detecting the occurrence of a predetermined event in the broadcast signal;

processing the broadcast signal at the occurence of the predetermined event to provide a first series of signal samples;

processing the broadcast signal a predefined time interval after the occurence of the predetermined event to provide a second series of signal samples;

comparing the first and second series of signal samples to detect a stability condition in the broadcast signal responsive to an identified predetermined threshold value;

extracting a signature from the broadcast signal after the occurence of said stability condition;

storing the extracted signature and a time of extraction thereof; and comparing the stored extracted signature with a plurality of reference signatures to identify the broadcast program.

2. The method as recited in claim 1 wherein the broadcast signal is a television broadcast signal and said predetermined event is a scene change from one video scene to another video scene in the television video signal.

3. The method as recited in claim 1 wherein the broadcast signal is a television broadcast signal and said predetermined event is a blank frame having silent audio followed by a non-blank frame.

4. The method as recited in claim 1 wherein the broadcast signal is a television broadcast signal and said predetermined event is a predetermined magnitude change in the television audio signal.

5. The method as recited in claim 1 wherein the broadcast signal is a television broadcast signal and said predetermined event is a predetermined amplitude change in a selected color component of the television video signal.

6. The method as recited in claim 1 wherein said predetermined event is the elapse of a predetermined time period after the occurrence of a previous predetermined event.

7. The method as recited in claim 6 wherein said predetermined time period is approximately 3 to 10 seconds.

8. The method as recited in claim 1 wherein the broadcast signal is a radio broadcast signal and said predetermined event is a predetermined change in magnitude of the radio signal.

9. The method as recited in claim 1 wherein the broadcast signal is a television broadcast signal and said step of detecting the occurrence of said predetermined event includes the steps of low pass filtering the video signal to produce a video envelope signal, periodically sampling said video envelope signal to provide a series of video samples, and comparing said video samples and a predetermined video threshold value to indicate a blank frame wherein said video samples are less than said predetermined video threshold value.

10. The method as recited in claim 9 wherein said step of low pass filtering the video signal includes the step of passing the video signal through a low pass filter having a cut off frequency of approximately 0 to 2 kHz.

11. The method as recited in claim 9 wherein the step of sampling said video envelope signal includes the step of taking a predetermined number of samples of said video envelope signal and taking the average of predetermined consecutive samples to generate a plurality of average signals, each average signal defining one of the features that comprises a feature string.

12. The method as recited in claim 9 wherein the step of sampling said video envelope signal includes the step of taking 56 samples of said video envelope signal and taking the average of every two ( consecutive samples to generate 28 features that comprise a feature string.

13. The method as recited in claim 9 further including the steps of calculating an audio energy level, comparing the calculated audio energy level and a predetermined audio energy threshold value to indicate silent audio wherein said calculated audio energy level is less than said predetermined audio energy threshold value, and comparing said video samples and a second predetermined video threshold value to indicate a non-blank frame and a blank frame predetermined event wherein said video samples are greater than said second predetermined video threshold value.

14. The method as recited in claim 1 wherein the broadcast signal is a television broadcast signal and said step of detecting the occurrence of said predetermined event includes the steps of low pass filtering the video signal to provide a video envelope signal, periodically sampling said video envelope signal to provide a series of video samples and comparing said series of video samples to a previous series of video samples to indicate a scene change predetermined event wherein the absolute value of the difference of said series of samples is greater than a predetermined video threshold value.

15. The method as recited in claim 14 wherein said step of low pass filtering said video signal includes the step of passing the video signal through a low pass filter having a cut off frequency of approximately 0 to 2 kHz.

16. The method as recited in claim 1 wherein said step of detecting the occurrence of said predetermined event includes the steps of processing said audio signal to provide a plurality of audio spectrum signals, and digitizing said audio spectrum signals, and comparing said digitized audio spectrum signals to previously produced digitized audio spectrum signals to indicate a predetermined event wherein a predetermined change in spectral composition is detected.

17. The method as recited in claim 16 wherein the step of processing said audio signal is provided in the range of approximately 330 Hz to 2.54 kHz.

18. The method as recited in claim 1 wherein said steps of processing the broadcast signal at the occurrence of the predetermined event to provide a first series of signal samples; and processing the broadcast signal a predefined time interval after the occurrence of the predetermined event to provide a second series of signal samples includes the steps of low pass filtering a video signal to provide a video envelope signal, and periodically sampling said video envelope signal to provide a series of video samples, and wherein the step of comparing the first and second series of signal samples to detect a stability condition in the broadcast signal responsive to an identified predetermined threshold value includes the steps of calculating an absolute value of the difference of the first and second series of video samples and comparing said calculated absolute values and said predetermined threshold value to indicate the stability condition wherein said calculated absolute values are less than said predetermined threshold value.

19. The method as recited in claim 18 further including the step of increasing said predetermined threshold value wherein a predetermined time period elapses after the occurrence of said detected predetermined event without detecting a stability condition.

20. The method as recited in claim 1 wherein said step of extracting a signature from the broadcast signal to be identified includes the steps of low pass filtering a video signal to provide a video envelope signal, periodically sampling said video envelope signal to provide a series of video samples, digitizing said video samples to provide a video signature, spectral filtering an audio signal to provide a plurality of audio spectrum signals, digitizing said audio spectrum signals to provide an audio signature, and combining said video signature and said audio signature.

21. The method as recited in claim 20 wherein said step of combining said video signature and said audio signature includes the steps of defining a first feature string representative of said video signature, defining a second feature string representative of said audio signature, and concatenating said first and second feature strings.

22. The method as recited in claim 1 wherein said reference signatures are generated by the steps of:
comparing said stored extracted signature with said plurality of reference signatures to identify an unmatched extracted signature; and
storing said unmatched extracted signature.

23. The method recited in claim 22 further including the steps of:
comparing said stored unmatched, extracted signatures to identify repetitively stored unmatched, extracted signatures.

24. A method as recited in claim 1 wherein said step of comparing the stored extracted signature with a plurality of reference signatures to identify a broadcast program includes the step of:
performing a variable range hash code search for at least one possible matching reference signature.

25. A method as recited in claim 24 further including the steps of:
calculating a measure of similarity for said possible matching reference signature;
comparing said calculated measure of similarity with a first predetermined threshold value to identify a matching reference signature; and
comparing said calculated measure of similarity with a second predetermined threshold value to vary the range of said variable range hash code search.

26. A method as recited in claim 25 further including the steps of storing said matching reference signatures with said time of extraction of the extracted signatures;
calculating the number of matching reference signatures in a series that indicate a particular broadcast program;
determining a sequence of said series of matching reference signatures that indicate a particular broadcast program; and
identifying the particular broadcast program wherein said calculated number is greater than a minimum value.

27. A system for identifying a plurality of defined braodcast programs in a broadcast signal comprising:
means for detecting the occurence of a predetermined event in the broadcast signal;
means for detecting a stability condition in the broadcast signal after the occurrence of said predetermined event; said stability condition detecting means including means for processing the broadcast signal at the occurrence of the predetermined event provide a first series of signal samples; means for processing the broadcast signal a predefined time interval after the occurrence of the predetermined event to provide a second series of signal samples; and means for comparing the first and second series of signal samples to detect a stability condition in the broadcast signal responsive to an identified predetermined threshold value;
means for extracting a signature from the broadcast signal after the occurrence of said stability condition;
means for storing the extracted signature and a time of extraction thereof; and
means for comparing the stored extracted signature with a plurality of reference signatures to identify a broadcast program.

28. The system as recited in claim 27 wherein the broadcast signal is a television broadcast signal and said predetermined event detecting means includes means for detecting a scene change from one video scene to another video scene in the television video signal.

29. The system as recited in claim 27 wherein the broadcast signal is a television broadcast signal and said predetermined event detecting means includes means for detecting a blank frame having silent audio followed by a non-blank frame.

30. The system as recited in claim 27 wherein the broadcast signal is a television broadcast signal and said predetermined event detecting means includes means for detecting a predetermined magnitude change in the television audio signal.

31. The system as recited in claim 27 wherein the broadcast signal is a television broadcast signal and said predetermined event detecting means includes means for detecting a predetermined amplitude change in a selected color component of the television video signal.

32. The system as recited in claim 27 wherein said predetermined event detecting means includes means for detecting the elapse of a predetermined time period after the occurrence of a previous predetermined event.

33. The system as recited in claim 32 wherein said predetermined time period is approximately 3–10 seconds.

34. The system as recited in claim 27 wherein said broadcast signal is a radio broadcast signal and said predetermined event detecting means includes means for detecting a predetermined change in magnitude in the radio signal.

35. The system as recited in claim 27 wherein the broadcast signal is a television broadcast signal and said means for detecting the occurrence of said predetermined event includes means for low pass filtering the video signal to produce a video envelope signal, means for periodically sampling said video envelope signal to provide a series of video samples, and means for comparing said video samples with a predetermined video threshold value to indicate a blank frame wherein said video samples are less than said predetermined video threshold value.

36. The system as recited in claim 35 wherein said means for low pass filtering said video signal has a cutoff frequency of approximately 0 to 2 kHz.

37. The system as recited in claim 27 wherein the broadcast signal is a television broadcast signal and said means for detecting the occurrence of said predetermined event includes means for low pass filtering said video signal to provide a video envelope signal, means for periodically sampling said video envelope signal to provide a series of video samples and means for comparing said series of video samples to a previous series of video samples to indicate a scene change predetermined event wherein the absolute value of the difference of said series of samples is greater than a predetermined video threshold value.

38. The system as recited in claim 37 wherein said means for low pass filtering said video signal has a cut-off frequency of approximately 0 to 2 kHz.

39. The system as recited in claim 27 wherein said means for detecting the occurrence of said predetermined event includes means for periodically sampling an audio signal to provide a plurality of audio spectrum signals, means for digitizing said audio spectrum signals, and means for comparing said audio spectrum signals to previously produced audio spectrum signals to indicate a predetermined event wherein a predetermined change in spectral composition is detected.

40. The system as recited in claim 39 wherein said audio spectrum signals have a range of approximately 330 Hz to 2.54 kHz.

41. The system as recited in claim 35 wherein the means for sampling said video envelope signal includes means for taking 56 samples of said video envelope signal and means for taking the average of every two consecutive samples to generate 28 features that comprise a feature string.

42. The system as recited in claim 35 wherein the means for sampling said video envelope signal includes means for taking a predetermined number of samples of said video envelope signal and means for taking the average of predetermined consecutive samples to generate a plurality of average signals, each average signal defining one of the features that comprises a feature string.

43. The system as recited in claim 27 wherein said means for extracting a signature from the broadcast to be identified includes means for low pass filtering a video signal to provide a video envelope signal, means for periodically sampling said video envelope signal to provide a series of video samples, means for digitizing said video samples to provide a video signature, means for spectral filtering an audio signal to provide a plurality of audio spectrum, signals, means for digitizing said audio spectrum signals to provide an audio signature, and means for combining said video signature and said audio signature.

44. The system as recited in claim 43 wherein said means for combining said video signature and said audio signature includes means for defining a first feature string representative of said video signature, means for defining a second feature string representative of said audio signature, and means for concatenating said first and second feature strings.

45. The system as recited in claim 27 wherein said means for comparing the stored extracted signature with a plurality of reference signatures to identify a broadcast program includes;
means for performing a variable range hsh code search for at least one possible matching reference signature.

46. The system as recited in claim 45 further including:
means for calculating a measure of similarity for said possible matching reference signature;
means for comparing said calculated measure of similarity with a first predetermined threshold value to identify a matching reference signature; and
means for comparing said calculated measure of similarity with a second predetermined threshold value to vary the range of said variable range hash code search.

47. The system as recited in claim 46 further including;
means for storing said matching reference signature with said time of extraction of the extracted signatures;
means for calculating the number of matching reference signatures in a series that indicate a particular broadcast program;
means for determining a sequence of said series of matching reference signatures that indicate a particular broadcast program; and
means for identifying the particular broadcast program wherein said calculated number is greater than a minimum value.

48. A method of monitoring a signal comprising the steps of;
detecting the occurrence of a predetermined event in the signal;
processing the signal at the occurrence if the predetermined event to provide a first series of signal samples;
processing the signal a predefined time interval after the occurrence of the predetermined event to provide a second series of signal samples;
comparing the first and second series of signal samples to detect a stability condition in the signal responsive to an identified predetermined threshold value;
extracting a signature from the signal after the occurrence of said stability condition; and
storing the extracted signature and a time of extraction thereof.

49. The method as recited in claim 48 further comprising the step of comparing the stored extracted signature with a plurality of reference signatures to identify a broadcast program.

50. The method as recited in cliam 48 wherein the signal is a television broadcast signal and said predetermined event is a scene change from one video scene to another video scene in the television video signal.

51. The method as recited in claim 48 wherein the signal is a television broadcast signal and said predetermined event is a blank frame having silent audio followed by a non-blank frame in the television video signal.

52. The method as recited in claim 48 wherein the signal is a television broadcast signal and said predetermined event is a predetermined magnitude change in the television audio signal.

53. The method as recited in claim 48 wherein the signal is a television broadcast signal and said predetermined event is a predetermined amplitude change in a selected color component of the television video signal.

54. The method as recited in claim 48 wherein said predetermined event is the elapse of a predetermined time period after tne occurrence of a previous predetermined event.

55. The method as recited in claim 54 wherein said predetermined time period is approximately 3-10 seconds.

56. The method as recited in claim 48 wherein said signal is a radio broadcast signal and said predetermined event is a predetermined change in magnitude in the radio signal.

57. The method as recited in claim 48 wherein the signal is a television broadcast signal and said step of detecting the occurrence of said predetermined event includes the steps of low pass filtering the video signal to produce a video envelope signal, periodically sampling said video envelope signal to provide a series of video samples, and comparing said video samples and a predetermined threshold value to indicate a blank frame wherein said video samples are less than said predetermined video threshold value.

58. The method as recited in claim 57 wherein said step of low pass filtering the video signal includes the step of passing the video signal through a low pass filter having a cut-off frequency of approximately 0 to 2 kHz.

59. The method as recited in claim 57 wherein the step of sampling said video envelope signal includes the step of taking a predetermined number of samples of said video envelope signal and taking the average of predetermined consecutive samples to generate a plurality of average signals, each average signal defining one of the features that comprises a feature string.

60. The method as recited in claim 57 wherein the step of sampling of said video envelope signal includes the step of taking 56 samples of said video envelope signal and taking the average of every two consecutive samples to generate 28 features that comprise a feature string.

61. The method as recited in claim 48 wherein the signal is a television broadcast signal and said step of detecting the occurrence of said predetermined event includes the steps of low pass filtering the video signal to provide a video envelope signal, periodically sampling said video envelope signal to provide a series of video samples and comparing said series of video samples to a previous series of video samples to indicate a scene change predetermined event wherein the absolute value of the difference of said series of samples is greater than a predetermined video threshold value.

62. The method as recited in claim 61 wherein said step of low pass filtering said video signal includes the step of passing the video signal through a low pass filter having a cut-off frequency of approximately 0 to 2 kHz.

63. The method as recited in claim 48 wherein said step of detecting the occurrence of said predetermined event includes the sreps of low pass filtering an audio signal to provide an audio spectrum signal, processing said audio spectrum signal to provide a plurality of audio spectrum signals, and digitizing said audio spectrum signals, and comparing said digitized audio spectrum signals to previously produced digitized audio spectrum signals to indicate a predetermined event wherein a predetermined change in magnitude is detected.

64. The method as recited in claim 63 wherein the step of processing said audio signal is provided in the range of approximately 330 Hz to 2.54 kHz.

65. The method as recited in claim 48 wherein said step of extracting a signature from the signal includes the steps of low pass filtering a video signal to provide a video envelope signal, periodically sampling said video envelope signal to provide a series ot video samples. digitizing said video samples to provide a video signature, low pass filtering an audio signal to provide an audio spectrum signal, processing said audio spectrum signal to provide a plurality of audio spectrum signals, digitizing said audio spectrum signals to provide an audio signature, and combining said video signature and said audio signature.

66. The method as recited in claim 65 wherein said step of combining said video signature and said audio signature includes the steps of defining a first feature string representative of said video signature, defining a second feature string representative of said audio signature, and concatenating said first and second feature strigs.

67. The method as recited in claim 48 wherein the steps of processing the signal at the occurrence of the predetermined event to provide a first series of signal samples; and processing the signal a predefined time interval after the occurrence of the predetermined event to provide a second series of signal samples includes the steps of low pass filtering a video signal to provide a video envelope signal, and periodically sampling said video envelope signal to provide a series of video samples, and wherein the step of comparing the first and second series of signal samples to detect a stability condition in the signal responsive to an identified predetermined threshold value includes the steps of calculating an absolute value of the difference of the first and second series of video samples, and comparing said calculated absolute values and said predetermined threshold value to indicate the stability condition wherein said calculated absolute values are less than said predetermined threshold value.

68. The method as recited in claim 49 wherein the step of comparing the signal extracted signature with a plurality of reference signatures includes the steps of:

performing a variable range cash code search for at least on possible matching reference signature;

calculating a measure ot similarity for said possible matching reference signature;

comparing said calculated measure of similarity with a first predetermined threshold value to identify a matching reference signature;

comparing said calculated measure of similarity with a second predetermined threshold value to vary the range of said variable range hash code search;

storing said matching rererence signatures with said time of extraction of the extracted signatures;

calculating the number of matching reference signatures in a series that indicate a particular broadcast program; and identifying the particular broadcast program wherein said calculated number is greater than a minimum value.

69. The method as recited in claim 68 further including the step of determining a sequence of said series of matching reference signatures that indicate a particular broadcast program.

70. A system for monitoring a signal for use in a system for identifying a plurality of defined broadcast programs in the monitored signal, the monitoring system comprising:

means for detecting the occurrence of a predetermined event in the signal;

means for detecting the occurrence of a stability condition in the signal after the occurrence of said predetermined events; said stability condition detecting means including means for processing the signal at the occurrence of the predetermined event to provide a first series of signal samples; means for processing the signal a predefined time interval after the occurrence of the predetermined event to provide a second series of signal samples; and means for comparing the first and second series of signal samples to detect a stability condition in the signal responsive to an identified predetermined threshold value;

means for extracting a signature from the signal after the occurrence of said stability condition; and means for storing the extracted signature and a time of extraction thereof.

71. The system as recited in claim 70 further comprising means for comparing the stored extracted signature with a plurality of reference signatures to identify a broadcast program.

72. The system as recited in claim 70 wherein the signal is a television broadcast signal and said predetermined event detecting means includes means for detecting a slow scene change from one video scene to another video scene in the television video signal.

73. The system as recited in claim 70 wherein the signal is a television broadcast signal and said predetemined event detecting means includes means for detecting a blank frame having silent audio followed by a non-blank frame in the television video signal.

74. The system as recited in claim 70 wherein the signal is a television broadcast signal and said predetermined event detecting means includes means for detecting a predetermined magnitude change in the television audio signal.

75. The system as recited i claim 70 wherein the signal is a television broadcast signal and said predetermined event detecting means includes means for detecting a predetermined amplitude change in a selected color component of the television video signal.

76. The system as recited in claim 70 wherein said predetermined event detecting means includes means for detecting the elapse of a predetermined time period after the occurrence of a previous predetermined event.

77. The system as recited in claim 76 wherein said predetermined time period is approximately 3-10 seconds.

78. The system as recited in claim 70 wherein the signal is a radio broadcast signal and said predetermined event detecting means includes means for detecting a predetermined change in magnitude of the radio signal.

79. The system as recited in claim 70 wherein the signal is a television broadcast signal and said means for detecting the occurrence of said predetermined event includes means for low pass filtering the video signal to produce a video envelope signal, means for periodically sampling said video envelope signal to provide a series of video samples, and means for comparing said video samples and a predetermined video threshold value to indicate a blank frame wherein said video samples are less than said predetermined video threshold value.

80. The system as recited in claim 79 wherein said means for low pass filtering the video signal has a cutoff frequency of approximately 0 to 2 kHz.

81. The system as recited in claim 79 wherein the means for sampling said video envelope signal includes means for taking a predetermined number of samples of said video envelope signal and means for taking the average of predetermined consecutive samples to generate a plurality of average signals, each average signal defining one of the features that comprises a feature string.

82. The system as recited in claim 79 wherein the means for sampling of said video envelope signal includes means for taking 56 samples of said video envelope signal and means for taking the average of every two consecutive samples to generate 28 features that comprise a feature string.

83. The system as recited in claim 70 wherein the signal is a television broadcast signal and said means for detecting the occurrence of said predetermined event includes means for low pass filtering the video signal to provide a video envelope signal, means for periodically sampling said video envelope signal to provide a series of video samples and means for comparing said series of video samples to a previous series of video samples to indicate a low scene change predetermined event wherein the absolure value of the difference of said series of samples is greater than a predetermined video threshold value.

84. The system as recited in claim 83 wherein said means for low pass filtering said video signal has a cutoff frequency of approximately 0 to 2 kHz.

85. The system as recited in claim 70 wherein said means for detecting the occurrence of said predetermined event includes means for processing an audio signal to provide a plurality of audio spectrum signals, and means for digitizing said audio spectrum signals, and means for comparing said digitized audio spectrum signals to previously produced digitized audio spectrum signals to indicate a predetermined event wherein a predetermined change is magnitude is detected.

86. The system as recited in claim 85 wherein the means for processing said audio signal is provided in the range of approximately 330 Hz to 2.54 kHz.

87. The system as recited in claim 70 wherein the signal is a television broadcast signal and said means for extracting a signature from the signal to be identified includes means for low pass filtering a video signal to provide a video envelope signal, means for periodically sampling said video envelope signal to provide a series of video samples, means for digitizing said video samples to provide a video signature, means for processing an audio signal to provide a plurality of audio spectrum signals, means for digitizing said audio spectrum signals to provide an audio signature, and means for combining said video signature and said audio signature.

88. The system as recited in claim 87 wherein said means for combining said video signature and said audio signature includes means for defining a first feature string representative of said video signature, means for defining a second feature string representative of said audio signature, and means for concatenating said first and second feature strings.

89. The system as recited in claim 70 wherein said means for processing the signal at the occurrence of the predetermined event to provide a first series of signal samples; and means for processing the signal a predefined time interval after the occurrence of the predetermined event to provide a second series of signal samples includes means for low pass filtering a video signal to provide a video envelope signal; and means for periodically sampling said video envelope signal to provide a series of samples; and wherein said means for comparing the first and second series of signal samples to detect a stability condition in the signal responsive to an identified predetemined threshold value includes means for calculating an absolute value of the difference of the first and second series of video samples; and means for comparing said calculated absolute values and the predetermined threshold value to indicate the stability condition wherein said calculated absolute values are less than said predetermined threshold value.

90. The system as recited in claim 89 further including means for increasing said predetermined threshold value wherein a predetermined time period elapses after the occurrence of said detected predetermined event without detecting a stability condition.

* * * * *